United States Patent
Matsui et al.

(10) Patent No.: US 10,013,193 B2
(45) Date of Patent: *Jul. 3, 2018

(54) SELF-EXPIRING DATA IN A VIRTUAL TAPE SERVER

(71) Applicant: INTERNATIONAL BUSINESS MACHINES CORPORATION, Armonk, NY (US)

(72) Inventors: Sosuke Matsui, Tokyo (JP); Takeshi Nohta, Tsukuba (JP); Aderson J. Pacini, Sao Paulo (BR); Michael R. Scott, Ocean View, HI (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/241,187

(22) Filed: Aug. 19, 2016

(65) Prior Publication Data

US 2018/0052618 A1   Feb. 22, 2018

(51) Int. Cl.
*G06F 3/06* (2006.01)

(52) U.S. Cl.
CPC .......... *G06F 3/0619* (2013.01); *G06F 3/0665* (2013.01); *G06F 3/0686* (2013.01)

(58) Field of Classification Search
CPC .... G06F 3/0604; G06F 3/0605; G06F 3/0607; G06F 3/0619; G06F 3/0664; G06F 3/0665; G06F 3/0686; G06F 3/0689; G06F 2003/0694
USPC ........................................ 703/24; 711/6, 111
See application file for complete search history.

(56) References Cited

U.S. PATENT DOCUMENTS

| | | | |
|---|---|---|---|
| 6,304,948 B1 | 10/2001 | Motoyama et al. | |
| 7,814,338 B2 | 10/2010 | Johnson | |
| 7,873,781 B2 | 1/2011 | Blendermann et al. | |
| 7,873,802 B2 | 1/2011 | Gokhale et al. | |
| 8,595,430 B2* | 11/2013 | Iwasaki | G06F 3/0617 711/100 |
| 2002/0004835 A1 | 1/2002 | Yarbrough | |
| 2004/0148458 A1* | 7/2004 | Sekine | G06F 3/061 711/111 |

FOREIGN PATENT DOCUMENTS

WO   9903098 A2   1/1999

OTHER PUBLICATIONS

List of IBM Patents or Patent Applications Treated as Related dated Aug. 23, 2016 (2 pages).
Aliabadi et al., "A Proposed Storage Virtualization Architecture for Efficient Information Management," IEEE, 2010 (6 pages).

* cited by examiner

*Primary Examiner* — Gary J Portka
(74) *Attorney, Agent, or Firm* — Griffiths & Seaton PLLC

(57) ABSTRACT

Embodiments for managing data in a virtual tape storage environment, by a processor device, are provided. A management system on a host is used to define volume expiration attributes for virtual tape volumes and the volume expiration attributes are forwarded to a virtual tape server. Return-to-scratch processing is performed on the virtual tape volumes directly on the virtual tape server by using the volume expiration attributes to compile candidate volumes without querying the host, where the candidate volumes are expired and converted to scratch by the virtual tape server.

18 Claims, 11 Drawing Sheets

SELF-EXPIRING DATA IN A VIRTUAL TAPE SERVER

BACKGROUND OF THE INVENTION

Field of the Invention

The present invention relates in general to computers, and more particularly to various embodiments for improved virtual tape storage using self-expiring data.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE DESCRIBED EMBODIMENTS

Various embodiments for managing data in a virtual tape storage environment, by a processor device, are provided. In one embodiment, a method comprises using a management system on a host to define volume expiration attributes for virtual tape volumes, the volume expiration attributes forwarded to a virtual tape server; and performing return-to-scratch processing on the virtual tape volumes directly on the virtual tape server by using the volume expiration attributes to compile candidate volumes without querying the host; wherein the candidate volumes are expired and converted to scratch by the virtual tape server.

In addition to the foregoing exemplary embodiment, various other embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1A:
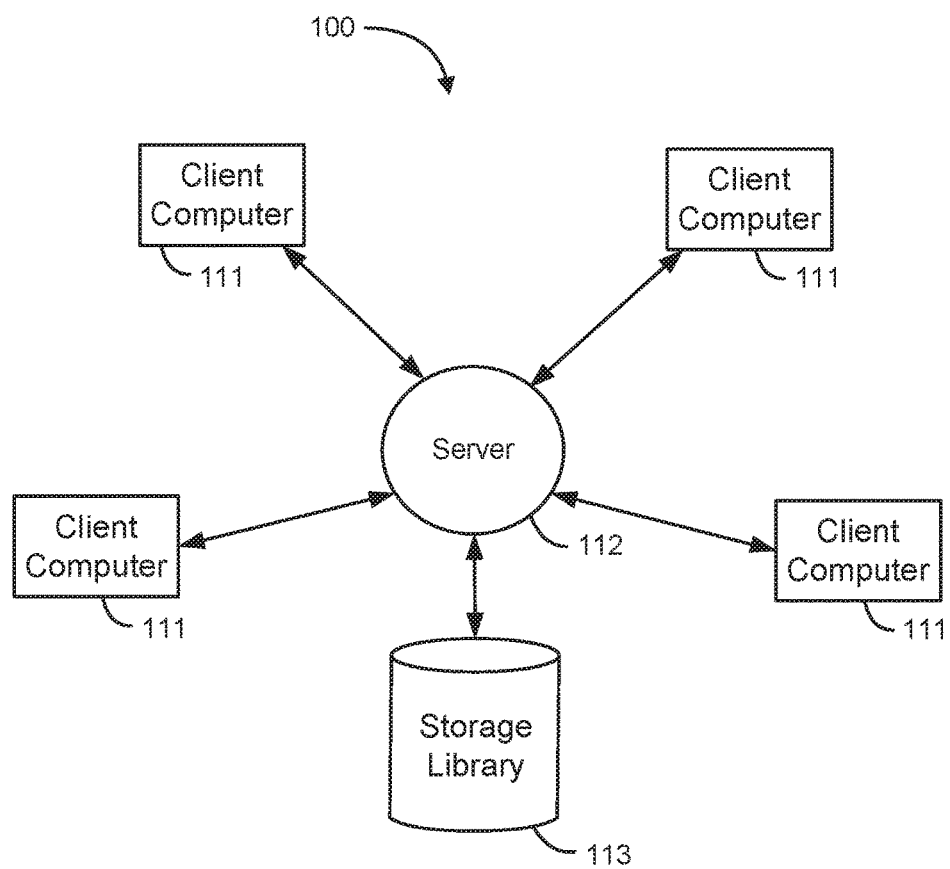
FIG. 1A is a block diagram illustrating a typical client-server library system for archiving data in which aspects of the invention may be implemented.

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

A virtual tape library (VTL) is a data storage virtualization technology employing a storage component (usually hard disk storage) as tape libraries or tape drives for use with existing backup software. Virtualizing the disk storage as tape allows integration of VTLs with existing backup software and existing backup and recovery processes and policies. The benefits of such virtualization include storage consolidation and faster data restore processes.

These tape storage systems of VTLs use management systems to configure and store data. For example, IBM® offers Data Facility Storage Management Subsystem (DFSMS™), which is a software suite that automatically manages data from creation to expiration. DFSMS provides allocation control for availability and performance, backup/recovery and disaster recovery services, space management, tape management, and reporting and simulation for performance and configuration tuning, and DFSMSrmm is the functional component of DFSMS for managing all removable media resources including automatic, manual, and virtual tape libraries (such as IBM's TS7700 series), for the z/OS® environment.

As is the state of the art, return-to-scratch processing within these virtualized storage environments which converts expired data volumes to scratch for reuse is performed primarily by host software (such as within the z/OS system) rather than the virtual tape server itself. This technique requires an abundant amount of resources and time to complete which thereby impacts application performance within the host.

The present invention contemplates a novel approach to mitigate this performance impact on the host by transferring a bulk of the return-to-scratch processing to the virtual tape server itself. As will be discussed below, one embodiment comprises using a management system on a host to define volume expiration attributes for virtual tape volumes, the volume expiration attributes forwarded to a virtual tape server; and performing return-to-scratch processing on the virtual tape volumes directly on the virtual tape server by using the volume expiration attributes to compile candidate volumes without querying the host; wherein the candidate volumes are expired and converted to scratch by the virtual tape server.

Turning now to the Figures, and in particular to FIG. 1A, there is depicted a block diagram of client-server library system 100 for archiving data in which aspects of the present invention may be implemented. The system 100 includes multiple client computers 111 from which data is transmitted to a server 112 for archiving in a data storage library 113. The client computers 111 also retrieve previously archived data from the library 113 through the server 112. Client computers 111 may be personal computers, portable devices (e.g., PDAs), workstations, or server systems, such as the IBM TS7720™. The client computers 111 may be connected to the server 112 through a local area network such as an Ethernet network, or by SCSI, iSCSI, Fibre Channel, Fibre Channel over Ethernet, or Infiniband. Server 112 may again be an IBM TS7740™ server, TS7720™ server, or other servers. Similarly, the data storage library 113 may be connected to the server 112 using a high data rate connection such as an optical or copper fiber channel, SCSI, iSCSI, Ethernet, Fibre Channel over Ethernet or Infiniband.

Figure 1B:
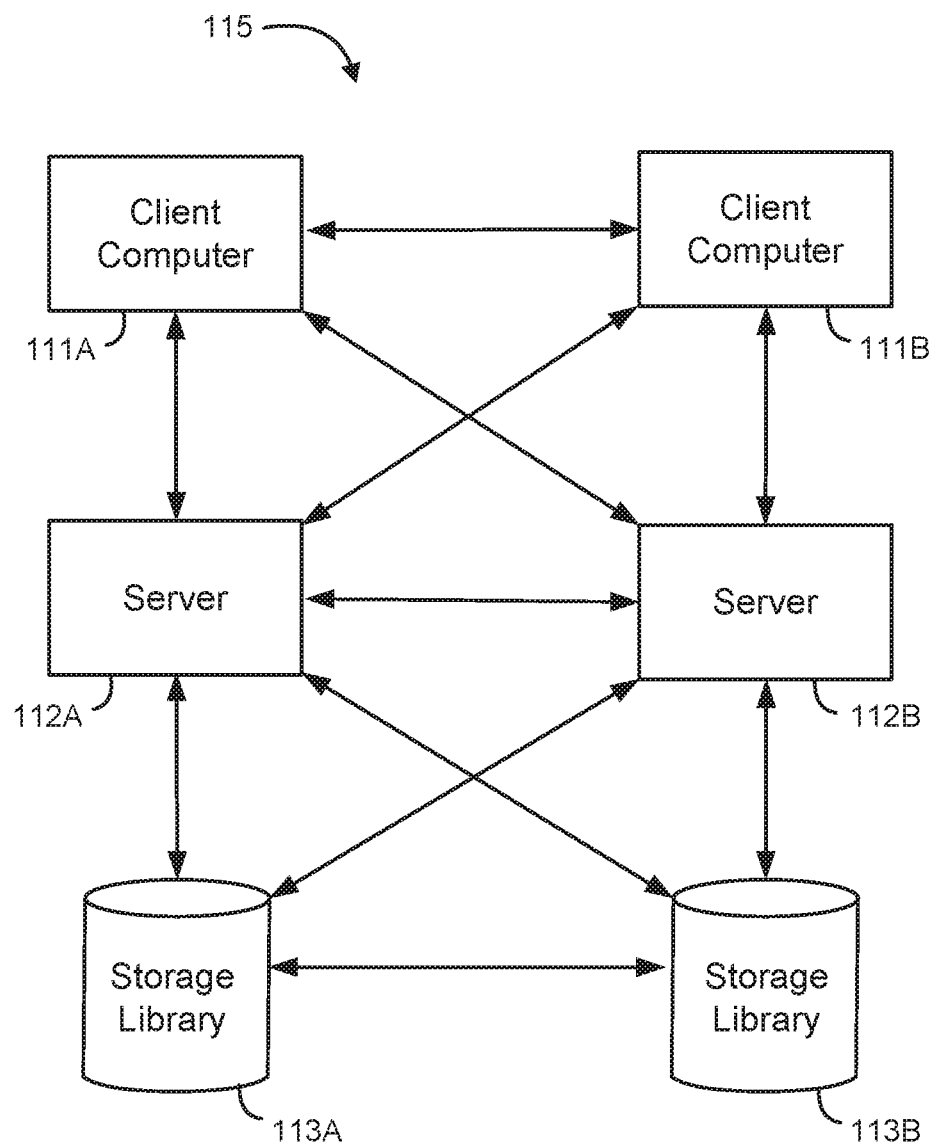
FIG. 1B is a block diagram illustrating a typical grid computing client-server library environment for archiving data in which aspects of the invention may be implemented.

FIG. 1B illustrates a block diagram of a typical grid computing library environment 115 for archiving data. The library environment 115 includes multiple client computers 111A and 111B interconnected to one another and to multiple server systems 112A and 112B. The server systems 112A and 112B are interconnected to one another and to multiple tape libraries 113A and 113B, which are also interconnected to one another.

Figure 2:
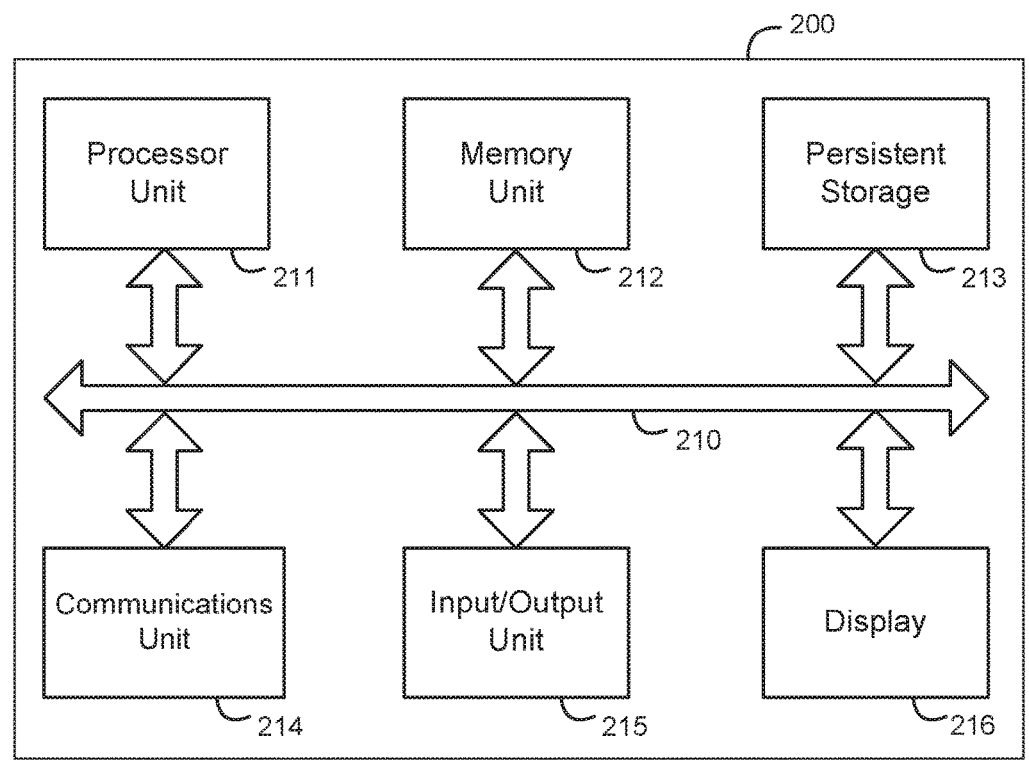
FIG. 2 is a block diagram illustrating a representative computer system which may be used as a client or a server computer.

FIG. 2 illustrates a block diagram of a data processing system that may be used as a client computer 111 or server system 112. As shown, a data processing system 200 includes a processor unit 211, a memory unit 212, a persistent storage 213, a communications unit 214, an input/output unit 215, a display 216 and a system bus 210. Computer programs are typically stored in the persistent storage 213 until they are needed for execution, at which time the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

Figure 3:
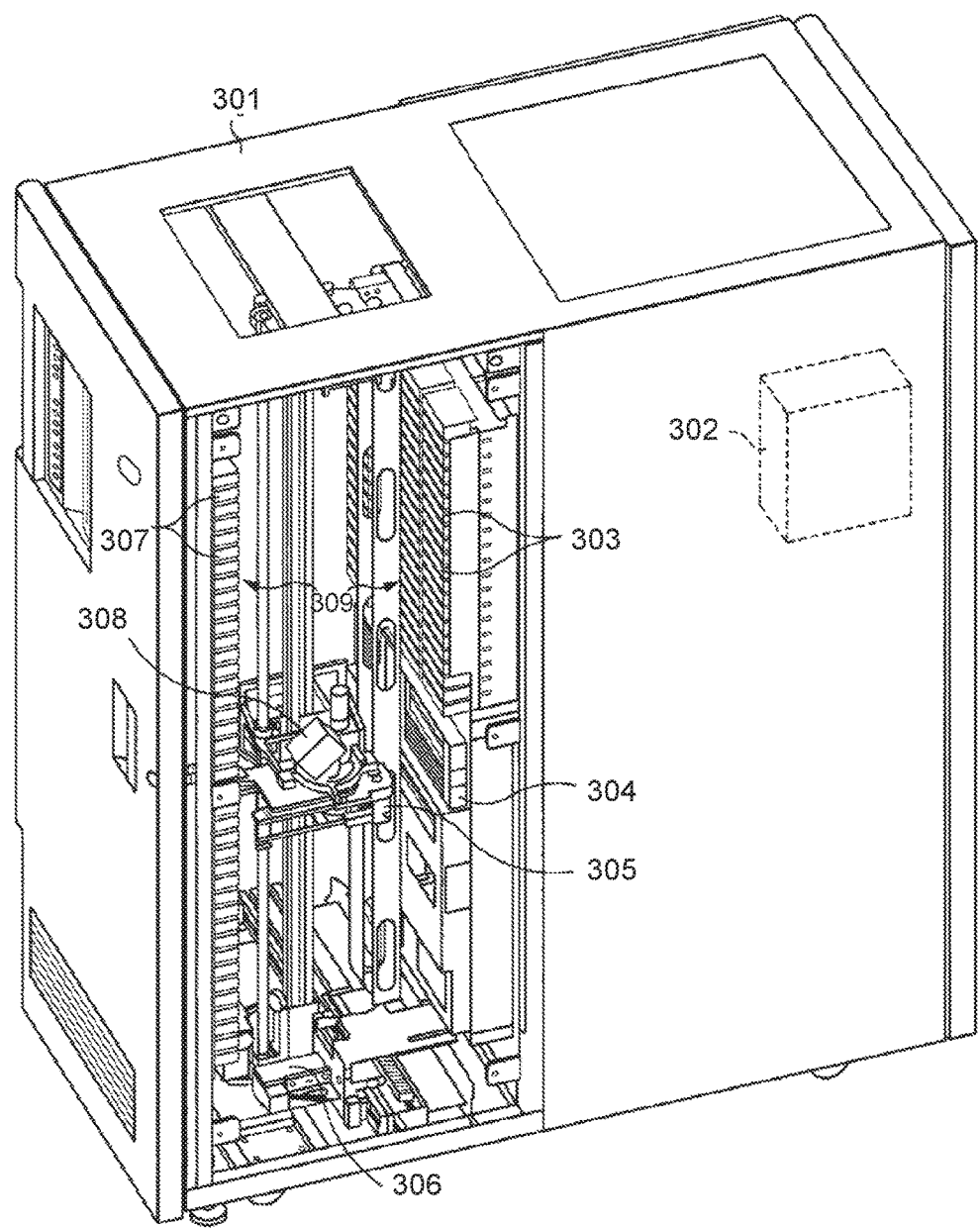
FIG. 3 illustrates a typical data storage tape library for archiving data in which aspects of the present invention may be implemented upon.

FIG. 3 illustrates an example of a data storage library 301 which may be found in an environment of an implementation of the present invention. The library 301 is an automated tape library that accommodates multiple tape drives 304 for reading and writing on tape media, such as single-reel or two-reel magnetic tape cartridges. Examples of the library 301 include IBM TS3400™ and TS3500™ Tape Libraries, IBM TotalStorage™ 3494 Tape Libraries, and IBM 3952™ Tape Frames Model C20, which store magnetic tape cartridges and use IBM TS1130™ tape drives. Other examples of the library 301 include IBM TS3310™ and TS3100/3200™ tape libraries which store magnetic tape cartridges and use IBM LTO (Linear Tape Open) tape drives. A plurality of tape media 303 are stored in banks or groups of storage slots 309. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. An access robot 306, including a cartridge picker 305 and a bar code reader 308 mounted on the picker, transports a selected cartridge 303 between a storage slot 309 and a drive 304.

The library 301 further has a library controller 302 which includes at least one microprocessor. The library controller 302 may serve to provide an inventory of the cartridges 303 and to control the library 301. Typically, the library controller 302 has suitable memory and data storage capability to control the operation of the library 301. The library controller 302 controls the actions of the access robot 306, cartridge picker 305, and bar code reader 308. The library controller 302 is interconnected through an interface to one or more host processors, which provides commands requesting access to particular tape media or to media in particular storage slots. A host, either directly, or through the library controller, controls the actions of the data storage drives 304. Commands for accessing data or locations on the tape media and information to be recorded on, or to be read from, selected tape media are transmitted between the drives 304 and the host. The library controller 302 is typically provided with a database for locating the tape cartridges 303 in the appropriate storage slots 309 and for maintaining the cartridge inventory.

Figure 4:
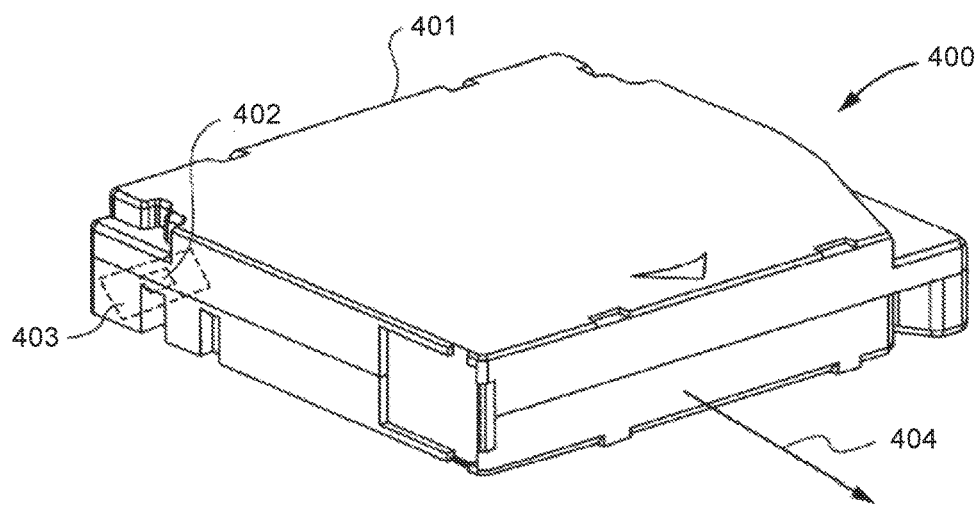
FIG. 4 illustrates an example of a tape cartridge media for use in the data storage tape library in FIG. 3.

FIG. 4 illustrates a perspective view of an exemplary tape cartridge 400 for use in a tape drive system 304 of FIG. 3. The tape cartridge 400 has a reel (not shown) for holding tape media (not shown) which is wound around the reel hub. The tape cartridge 400 further includes an RFID cartridge memory 402 which is on printed circuit board 403, for wireless interfacing with the tape drive 304 and the cartridge picker 305. The tape cartridge 400 is referred to as a single-reel cartridge as it includes only one tape reel which acts as a supply reel during operation. A take-up reel is provided in the tape drive 304 for receiving the tape media when the tape media is being unspooled from the tape reel. In a different design of the tape drive 304, a take-up reel might be included in the cartridge 400 itself rather than in the tape drive 304. Such a tape cartridge is referred to as a dual-reel cartridge. Cartridge 400 is inserted along direction 404 into tape drive 304.

Figure 5:
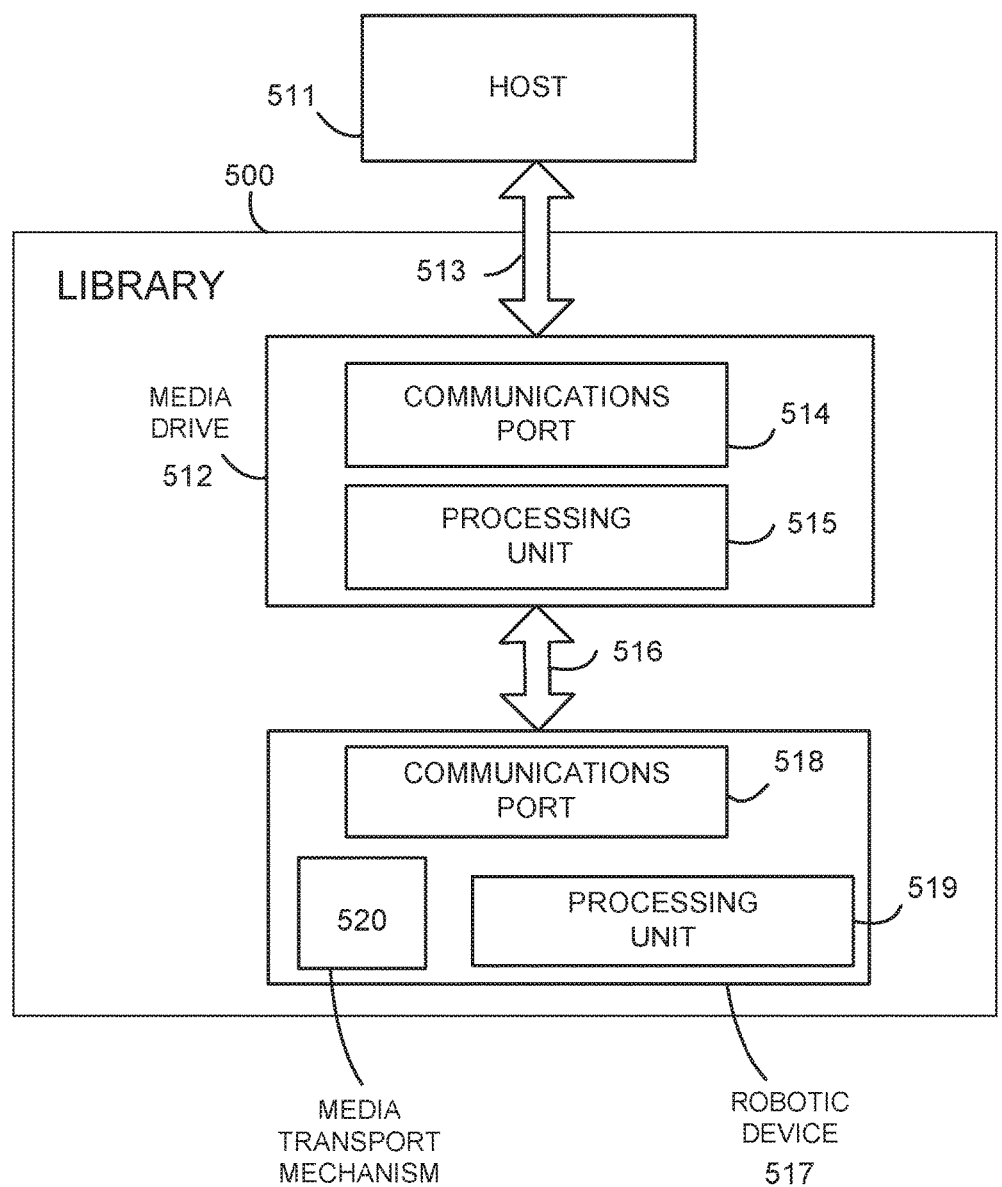
FIG. 5 illustrates a block diagram showing an exemplary data storage tape library in communication with a host computer for providing aspects of the invention.

FIG. 5 is a block diagram showing the functional components of an exemplary data storage tape library 500 in communication with a host computer 511 for providing aspects of the invention. The library 500 is attached to a host 511, and includes a media drive 512 and a robotic device 517. Data and control path 513 interconnects the host 511 and drive 512. Similarly, data and control path 516 interconnects the drive 512 and the robotic device 517. The paths 513 and 516 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 513 and 516 may employ serial, parallel, or another communications format, using digital or analog signals as desired. Communications with the media drive 512 and robotic device 517 are through communications ports 514 and 518, respectively.

Both the media drive 512 and the robotic device 517 include respective processing units 515 and 519. The library 500 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 511 may be a server, workstation, personal computer, or other means for exchanging data and control signals with the media drive 512. The drive 512 comprises a machine for reading data from and/or writing data to exchanging data with a portable data storage media. The robotic device 517 includes the processing unit 519 and a media transport mechanism 520 coupled to processing unit 519. The media transport mechanism 520 includes servos, motors, arms, grippers, sensors and other robotic, mechanical and electrical equipment to perform functions that include (at least) the transportation of media items between the drive 512, various storage bins (not shown), import/export slots, etc. The mechanism 520 may, for example, comprise an auto-loader mounted to the drive 512, a robotic arm housed inside a mass storage library, or another suitable device. As an example, the mechanism 520 may comprise an access robot 306, cartridge picker 305 and bar code reader 308 from FIG. 3.

As aforementioned, return-to-scratch processing within these virtualized storage environments which converts expired data volumes to scratch for reuse is performed primarily by host software (such as within the z/OS system) rather than the virtual tape server itself. This technique requires an abundant amount of resources and time to complete which thereby impacts application performance within the host. That is, host software on each system must be run to initiate return-to-scratch processing to free up the virtual volumes on the virtual tape server whose data is expired and no longer needed.

Currently, the tape management system (TMS) must initiate this processing by running its 'housekeeping' job. Using DFSMSrmm as an example, this processing begins by an unload of the removable media manager (RMM) control data set (CDS) into memory that is compared with a client specified set of expiratory rules in vital record specifications (VRS). The rules in the VRS are then used to determine what data sets on the volumes can be expired, and the RMM sets bits in the CDS that indicate in the next phase of the processing, expiration processing (EXPROC), that the volumes may be moved to "PENDING RELEASE" state. In a subsequent run of the EXPROC (for example, in the next day's housekeeping job), the RMM will then call the DFSM-Soam (object manager) to change the use attribute to "SCRATCH". The OAM then calls asynchronous object manager (AOM) and requests to the virtual tape server library manager component that the category be changed on the volumes to reflect they will be eligible candidates for a scratch mount (once an "EXPIRE DELETE" command is satisfied). If the category change is honored, the library returns control to AOM, who informs the OAM that the use attribute in the volume catalog (TCDB) can now be changed to indicate the volume is a "SCRATCH" candidate. Finally, OAM returns control to the RMM and indicates that RMM may now also reflect that the volume is "SCRATCH".

Figure 6:
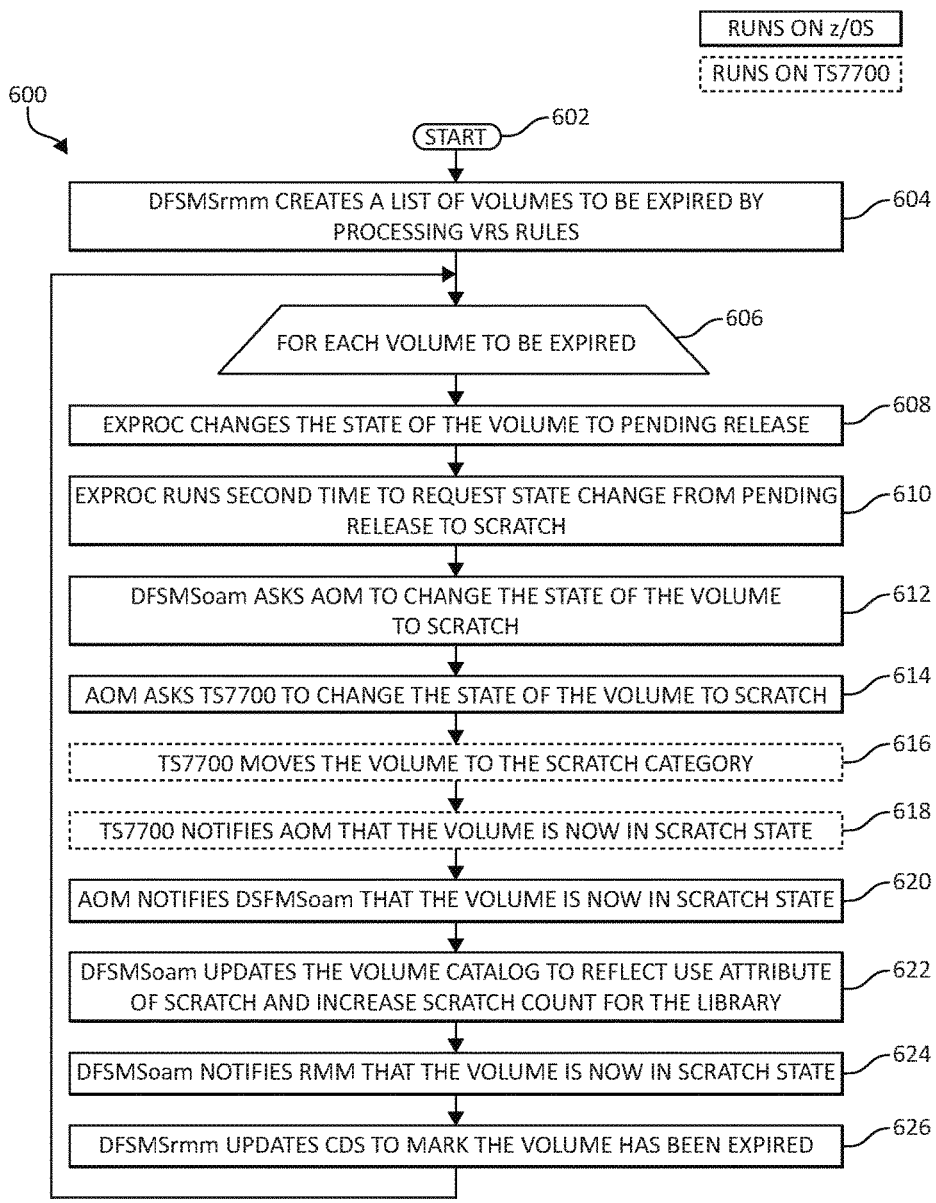
FIG. 6 illustrates a flowchart of a method for managing data in a virtual tape storage environment, for presenting aspects of the present invention.

For clarity, an overview of the aforementioned process is reviewed in the method 600 of FIG. 6. The method 600 begins (step 602) with the DFSMSrmm (running on z/OS) creating a list of volumes to be expired by processing VRS rules (step 604). For each volume to be expired (step 606), the EXPROC changes the state of the volume to "PENDING RELEASE" (step 608). EXPROC runs a subsequent time to request an additional state change from "PENDING RELEASE" to "SCRATCH" for the volume (step 610). The DFSMSoam then asks the AOM to change the state of the volume to a "SCRATCH" state (step 612). The AOM communicates with the virtual tape server (e.g. IBM TS7700) to change the state of the volume to "SCRATCH" (step 614).

Advancing, the virtual tape server moves the volume to the "SCRATCH" category (step 616), and notifies the AOM that the volume is now in a "SCRATCH" state (step 618). Continuing then on z/OS (the host), the AOM notifies the DFSMSoam that the volume is now in the "SCRATCH" state (step 620), and the DFSMSoam updates its volume catalogue to reflect the use attribute of "SCRATCH" for the volume and increases a "SCRATCH COUNT" for the entire library (step 622). The DFSMSoam then notifies the RMM that the volume is now in the "SCRATCH" state (step 624), and the DFSMSrmm updates the CDS to mark the volume has been expired (step 626). The method 600 then returns to step 606 for the next volume to be expired.

This process happens serially for each volume that must be moved to scratch and consumes a large amount of CPU and memory as well as requiring a lot of input/output (I/O) to the RMM CDS and the OAM TCDB. In some cases, this processing has been known to run up to 14 hours for a large tape library and has been prone to cause resource deadlocks with other components involved in tape processing. Accordingly, as aforementioned, the mechanisms of the present invention shift much of this return-to-scratch processing to the virtual tape server itself to improve both host and tape storage server performance, as will be further discussed.

Figure 7:
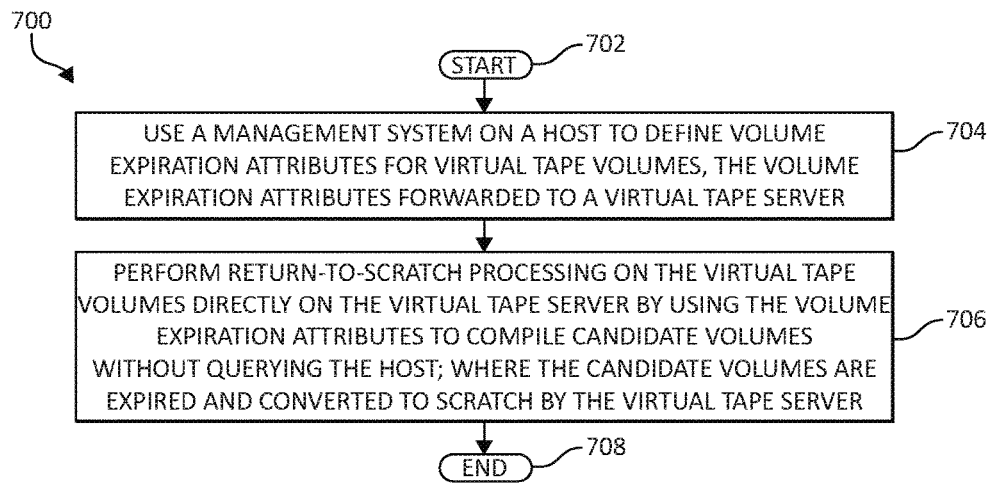
FIG. 7 illustrates a flowchart of a method for managing data in a virtual tape storage environment, in accordance with aspects of the present invention.

FIG. 7 illustrates a method 700 for managing data in a virtual tape storage environment, in accordance with one embodiment of the present invention. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s)

implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins (step 702) by using a management system on a host to define volume expiration attributes for virtual tape volumes, the volume expiration attributes forwarded to a virtual tape server (step 704). Return-to-scratch processing on the virtual tape volumes is then performed directly on the virtual tape server by using the volume expiration attributes to compile candidate volumes without querying the host; wherein the candidate volumes are expired and converted to scratch by the virtual tape server (step 706). The method 700 ends (step 708).

In various embodiments described herein, the storage management subsystem (SMS) construct on the host side is able to specify how data is to be handled on the virtual tape server. In practice, there is already in place the ability to set constructs on the host side in the SMS such that the number of days of non-usage can be used as a trigger by the RMM to expire data. Additionally, in the SMS constructs on the host side there are a variety of expiration date (EXPDT) settings for tape expiration that may be included in a similar construct that is set up on the virtual tape server. IBM's TS7700 is one example of a virtual tape server where this SMS construct information is already known and assigned to volumes in the current architecture. Therefore, by adding processing in the virtual tape server to analyze when the last time a volume has been mounted for read and/or write and compare this to the storage construct assigned by the host, a process may be implemented within the virtual tape server itself that detects when the data should be expired without involving the host. The data may then be expired using hardware resources without involving the host until a very last stage when the TCDB and the TMS CDS must be updated. In this way, all the steps on the host in the current process to return-to-scratch processing are avoided for data whose expiration is based on age and last reference, except for the final update, which requires a trivial amount of resources and may be done by a batch update, rather than in a serial fashion. Additionally, for operating systems who may not have an automated return-to-scratch process, the functionality of the present invention provides the implementation by which the virtual tape server performs its own return-to-scratch processing, making the virtual tape server hardware that much more useful on such operating systems.

As mentioned, the rules on data expiration are set up on the host via the TMS. IBM's DFSMSrmm is used herein as an example, but all TMS operate similarly. A client (user) configures the rules (sometimes called VRS or vital record specifications), regarding expiration of data. VRS that are set up to be based on the age of the data, or the last reference date of the data are very common, and these kinds of rules can be implemented via the SMS constructs that are defined on the host by the client. These SMS constructs may be coded to specify expiration of data based on a data create date or last reference date of the data (either last read or last write).

On the virtual tape server (e.g. IBM TS7700), the expiration attributes are set on the management interface (MI). For example, a storage construct may include a field such as "Private Mount to Scratch Mount Delay: xx hours". A scratch mount binds a logical volume (LVOL) to the storage construct and the virtual tape server sets the attribute and category time to its library database (DB). In this way, the age of the data on the volume and its last reference date may be referred to from within the virtual tape server to determine if the data is eligible to be expired, without querying the host or using host resources.

The virtual tape server then processes each storage group (SG) that is defined wherein a list of volumes is compiled whose data is eligible to be expired within that SG. The virtual tape server's microcode queries its DB and checks the category, the expiration attribute, and the category time. When the virtual tape server finds a volume which can be moved to scratch, the use attribute of the volume is changed to a new category called "SCRATCH HOLD", indicating the volumes are eligible to be reused for private but not for scratch mount.

Next, the list of volumes whose data is eligible to be expired is communicated to the host via the AOM and the TMS and OAM are both notified that these volumes are now scratch. Subsequently, the TMS CDS and the OAM TCDB are then updated to reflect all the volumes that have changed status to scratch and the scratch counts for the library entry are updated in the OAM TCDB. Upon completion of the host side processing, the host notifies its completion to virtual tape server which then moves all the volumes in the scratch hold state to scratch, and it is at this point the volumes may be reused for scratch.

Thus, when the host runs its housekeeping process as usual, this large subset of volumes is already processed and the 'normal' housekeeping process becomes much more streamlined and shortened, using less resources and causing less contention than the traditional process. In fact, host housekeeping may be totally unneeded if the client manages all data using create dates and last reference dates.

Figure 8:
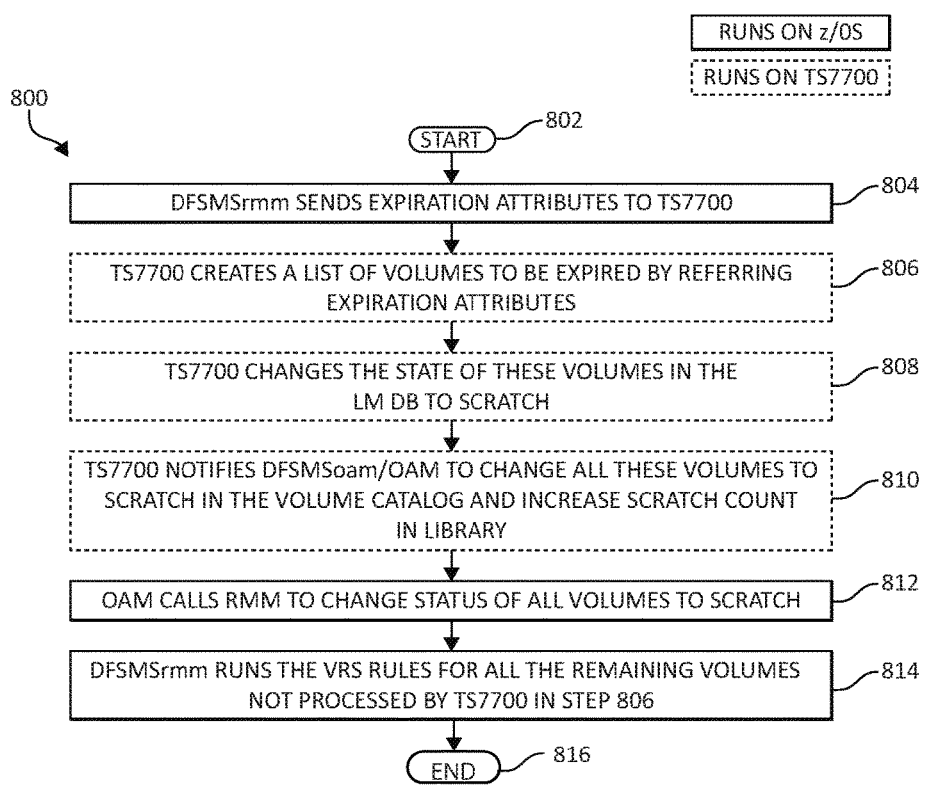
FIG. 8 illustrates a flowchart of a method for managing data in a virtual tape storage environment, in accordance with aspects of the present invention.

A review of this process is provided hereinbelow. FIG. 8 illustrates a method 800 for managing data in a virtual tape storage environment, in accordance with one embodiment of the present invention. The method 800 may be performed in accordance with the present invention in any of the environments depicted in FIGS. 1-5, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

The method 800 begins (step 802) with the management software running on the host (e.g. IBM z/OS) sending expiration attributes for data volumes to the virtual tape server (e.g. IBM TS7700) (step 804). The virtual tape server compiles a list of candidate volumes to be expired and returned to scratch by referring to the expiration attributes set in the VRS (step 806). The virtual tape server changes the state of the candidate volumes in its DB to a scratch state (step 808). The virtual tape server then communicates to the OAM to change the use attribute of the volumes to scratch in the volume catalog and increase the volume scratch count for the tape library (step 810). The OAM then calls the RMM to change the status of all the candidate volumes to scratch (step 812). Finally, the DFSMSrmm runs the VRS rules for all remaining volumes not processed by the virtual tape server in step 806 (step 814), and the method 800 ends (step 816).

Figure 9:
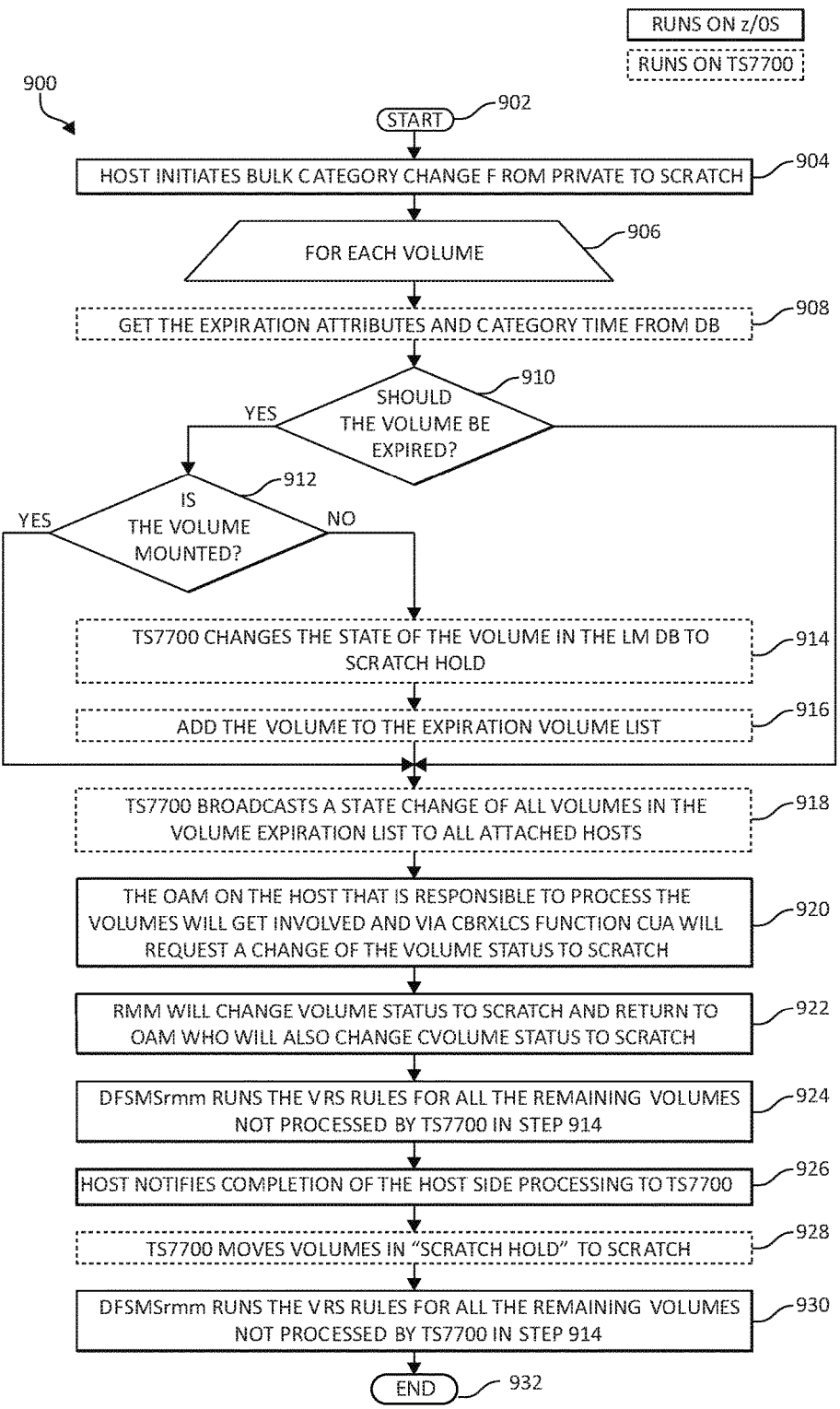
FIG. 9 illustrates an additional flowchart of a method for managing data in a virtual tape storage environment, in accordance with aspects of the present invention.

Additional embodiments continue in FIG. 9, which illustrates a method 900 for managing data in a virtual tape storage environment, in accordance with one embodiment of the present invention. The method 900 may be performed in accordance with the present invention in any of the environments depicted in FIGS. 1-5, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

The method 900 begins (step 902), with the host initiating a bulk category change of volumes from private to scratch (step 904). For each volume to be expired (step 906), expiration attributes and the data category time are collected from the library DB (step 908). In a decision step 910, it is determined from the expiration attributes and data category time whether the volume should be expired. If the volume is not eligible to be expired, the method 900 continues to step 918 described below. If, at step 910, the volume is determined to be eligible for expiration, a subsequent determination is made as to whether the volume is mounted (step 912). If, at step 912, the volume is mounted, the method 900 again continues to step 918 described below.

Continuing, if, at step 912, the volume is determined not to be mounted, the virtual tape server changes the state of the volume in its library DB to the scratch hold state (step 914), and the volume is added to the compiled list of candidate volumes for expiration (step 916). The virtual tape server then broadcasts a state change of all the volumes in the complied list of candidate volumes to all attached hosts in a similar manner to a cartridge entry broadcast (step 918). The OAM on the host responsible to process the volumes becomes involved via its CBRXCS (macro function) and the change use attribute (CUA) function will request a change of the status of the volumes to scratch (step 920).

Advancing, the RMM then changes the volume status to scratch and returns to the OAM which also changes the volume status to scratch (step 922). The DFSMSrmm then runs the VRS rules for all remaining volumes not processed by the virtual tape server in step 914 (step 924). The host subsequently notifies its processing completion to the virtual tape server (step 926), and the virtual tape server then moves all volumes in the scratch hold state to scratch (step 928). Here again, the DFSMSrmm processes the VRS rules for all remaining volumes not processed in step 914 (step 930), and the method 900 ends (step 932).

Figure 10:
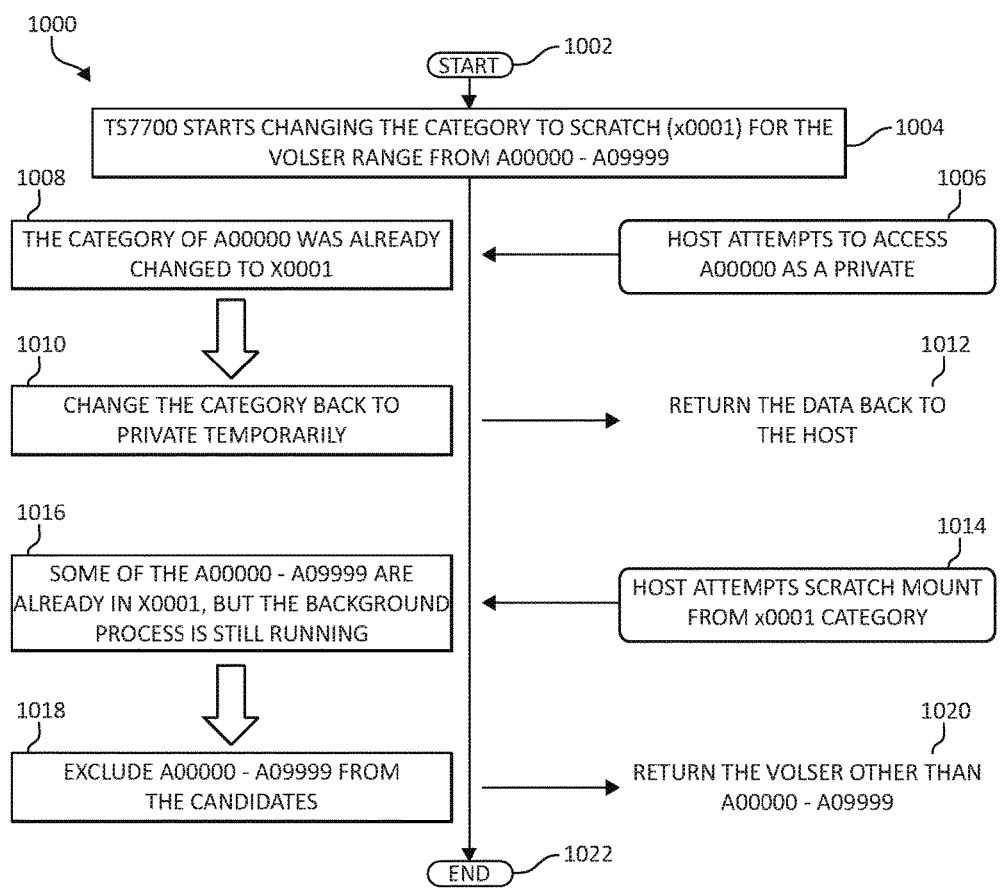
FIG. 10 illustrates still an additional flowchart of a method for managing data in a virtual tape storage environment, in accordance with aspects of the present invention.

In some embodiments, when volumes within the virtual tape server in the scratch hold state, the following process shown in FIG. 10 may be used for private mount and scratch mount requests. FIG. 10 illustrates a method 1000 for managing data in a virtual tape storage environment, in accordance with one embodiment of the present invention. The method 1000 may be performed in accordance with the present invention in any of the environments depicted in FIGS. 1-5, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

The method 1000 begins (step 1002) with the virtual tape server starting to change volume categories to scratch (x0001) for a volser range of A00000-A09999 (step 1004). In this example, when the host attempts to access A00000 as a private mount, yet the category of A00000 has already been changed to scratch (x0001) (step 1008), the category of A0000 is temporarily changed back to private (step 1010), and the data is returned back to the host (step 1012).

Continuing, when the host attempts a scratch mount from the x0001 category (step 1014), yet the background process is still running (where some of the volsers A00000-A09999 are already changed to x0001) (step 1016), the A0000-A09999 volser range is excluded from the candidates to return (step 1018), and a volser other than one in the range of A00000-A09999 is returned to the host (step 1020). The method 1000 ends (step 1022).

As previously mentioned, a significant advantage of the mechanisms of the present invention is that much of the return-to-scratch processing is shifted from the host side to the virtual tape server side. However, this functionality may offer unintended consequences. For example, by moving most of the housekeeping job from the host to the virtual tape server, the processing job may incur a performance impact on the grid link. To alleviate such a performance impact, in some embodiments, a resource usage of processing components may be monitored on the virtual tape server, and the expiration processing may be suspended/resumed such that the processing runs when the virtual tape server is not in a high demand for performing workloads, as determined by a predetermined threshold set by the user. In other embodiments, message alerts may be provided to this effect to the user such that the processing may be suspended/resumed manually. The priority of the return-to-scratch processing will generally be performed behind incoming host workloads, however flags may be set in the system log to send alerts to the user based upon predetermined settings such that if the number of scratch tapes becomes low for a specific media or media type, the return-to-scratch processing priority may be increased temporarily in order to replenish the level of scratch tapes within the system quickly.

Volume recovery once the virtual tape server determines a volume is to be expired is trivial and need not be altered as is performed in the art currently. For example, if the client uses a "delete expire" command, they have a grace period where the volume still have a consistent copy in the grid. As long as this consistent copy is available, the RMM may be used to "CHANGEVOLUME STATUS (MASTER)" and the action will therefore update the RMM CDS, OAM TCDB, and change category in the virtual tape server to the private category. Additionally, before any volume are released a subsequent check may again be performed against the expiration attributes to ensure that the volume should still be expired (if the volume was updated at any point during this process it would be removed from the list of expiration volumes). In still other embodiments, the virtual tape server MI may create a report of the list volumes to be expired and require client permission to perform the processing of such, which may in the RMM be termed as a "CONFIRM RELEASE" action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data in a virtual tape storage environment, by a processor device, comprising:
    using a management system on a host to define volume expiration attributes for virtual tape volumes, the volume expiration attributes forwarded to a virtual tape server;
    performing return-to-scratch processing on the virtual tape volumes directly on the virtual tape server by using the volume expiration attributes to compile candidate volumes without querying the host; wherein the candidate volumes are expired and converted to scratch by the virtual tape server; and
    changing, by the virtual tape server, a use attribute of the candidate volumes to a scratch hold state, the scratch hold state indicating the candidate volumes are eligible to be used for private mount yet not eligible to be used for scratch mount.

2. The method of claim 1, wherein compiling candidate volumes further includes creating, by the virtual tape server, a list of the candidate volumes by querying a volume database of the virtual tape server to discover the virtual tape volumes meeting criteria defined by the volume expiration attributes; and
    the criteria defined by the volume expiration attributes include at least one of a data age and a last reference to the virtual tape volumes.

3. The method of claim 2, further including communicating, by the virtual tape server to the host, the candidate volumes compiled on the list of candidate volumes are in a scratch state.

4. The method of claim 3, further including, upon receiving the communication that the candidate volumes are in the scratch state, updating the management system on the host to reflect the candidate volumes are in the scratch state; and updating scratch counts for each library entry.

5. The method of claim 4, further including notifying the virtual tape server upon completion of the updating by the host; and
    upon receiving the notification by the virtual tape server, moving the candidate volumes in the scratch hold state to the scratch state on the virtual tape server.

6. The method of claim 5, further including performing, by the management system on the host, a housekeeping job for all remaining volumes not processed by the virtual tape server.

7. The method of claim 1, further including monitoring a resource usage of the virtual tape server; and
    performing the return-to-scratch processing when the resource usage of the virtual tape server is below a predetermined resource threshold.

8. The method of claim 7, further including temporarily increasing a priority of the return-to-scratch processing thereby precluding the predetermined resource threshold when a number of scratch volumes within the virtual tape server falls below a predetermined number.

9. The method of claim 2, further including providing, by the virtual tape server, the list of candidate volumes as a report to a user; and
    requiring permission by the user to expire and convert to scratch the candidate volumes by the virtual tape server.

10. A system for managing data in a virtual tape storage environment, the system comprising:
    a host;
    a virtual tape server; and
    a processor device in communication with the host and the virtual tape server, wherein the processor device:
        uses a management system on the host to define volume expiration attributes for virtual tape volumes, the volume expiration attributes forwarded to the virtual tape server;
        performs return-to-scratch processing on the virtual tape volumes directly on the virtual tape server by using the volume expiration attributes to compile candidate volumes without querying the host; wherein the candidate volumes are expired and converted to scratch by the virtual tape server; and
        changes, by the virtual tape server, a use attribute of the candidate volumes to a scratch hold state, the scratch hold state indicating the candidate volumes are eligible to be used for private mount yet not eligible to be used for scratch mount.

11. The system of claim 10, wherein compiling candidate volumes further includes creating, by the virtual tape server, a list of the candidate volumes by querying a volume database of the virtual tape server to discover the virtual tape volumes meeting criteria defined by the volume expiration attributes; and
    the criteria defined by the volume expiration attributes include at least one of a data age and a last reference to the virtual tape volumes.

12. The system of claim 11, wherein the processor device communicates, by the virtual tape server to the host, the candidate volumes compiled on the list of candidate volumes are in a scratch state.

13. The system of claim 12, wherein the processor device, upon receiving the communication that the candidate volumes are in the scratch state, updates the management system on the host to reflect the candidate volumes are in the scratch state; and updating scratch counts for each library entry.

14. The system of claim 13, wherein the processor device notifies the virtual tape server upon completion of the updating by the host; and
    upon receiving the notification by the virtual tape server, moves the candidate volumes in the scratch hold state to the scratch state on the virtual tape server.

15. The system of claim 14, wherein the processor device performs, by the management system on the host, a housekeeping job for all remaining volumes not processed by the virtual tape server.

16. The system of claim 10, wherein the processor device monitors a resource usage of the virtual tape server; and
   performs the return-to-scratch processing when the resource usage of the virtual tape server is below a predetermined resource threshold.

17. The system of claim 16, wherein the processor device temporarily increases a priority of the return-to-scratch processing thereby precluding the predetermined resource threshold when a number of scratch volumes within the virtual tape server falls below a predetermined number.

18. The system of claim 11, wherein the processor device provides, by the virtual tape server, the list of candidate volumes as a report to a user; and
   requires permission by the user to expire and convert to scratch the candidate volumes by the virtual tape server.

* * * * *